United States Patent [19]

Scholl et al.

[11] Patent Number: 4,992,548

[45] Date of Patent: Feb. 12, 1991

[54] NEW CATALYSTS, THEIR USE FOR THE PRODUCTION OF ISOCYANURATE POLYISOCYANATES

[75] Inventors: Hans-Joachim Scholl; Josef Pedain, both of Cologne, Fed. Rep. of Germany

[73] Assignee: Bayer Aktiengesellschaft, Bayerwerk, Fed. Rep. of Germany

[21] Appl. No.: 391,213

[22] Filed: Aug. 8, 1989

[30] Foreign Application Priority Data

Aug. 13, 1988 [DE] Fed. Rep. of Germany ....... 3827596

[51] Int. Cl.[5] ............................................ C07D 251/34
[52] U.S. Cl. ..................................... 544/193; 544/221; 544/222; 524/101; 528/48
[58] Field of Search ........................ 544/193, 221, 222

[56] References Cited

U.S. PATENT DOCUMENTS

| | | | |
|---|---|---|---|
| 3,487,080 | 12/1969 | Hyogo et al. | 260/248 |
| 3,980,594 | 9/1976 | Fabris et al. | 260/2.5 |
| 4,324,879 | 4/1982 | Bock et al. | 528/45 |
| 4,412,073 | 10/1983 | Robin | 544/193 |
| 4,419,513 | 12/1983 | Breidenbach et al. | 544/222 |
| 4,487,928 | 12/1984 | Richter et al. | 544/193 |
| 4,537,961 | 8/1985 | Robin | 544/193 |
| 4,582,861 | 4/1986 | Galla et al. | 521/118 |
| 4,582,888 | 4/1986 | Kase et al. | 528/49 |
| 4,604,418 | 8/1986 | Shindo et al. | 524/296 |
| 4,675,401 | 6/1987 | Robin | 544/193 |
| 4,736,008 | 4/1988 | Kouno et al. | 528/57 |

FOREIGN PATENT DOCUMENTS

| | | |
|---|---|---|
| 3240613 | 5/1984 | Fed. Rep. of Germany . |
| 920080 | 3/1963 | United Kingdom . |

OTHER PUBLICATIONS

Polyurethanes, Chemistry and Technology, Part I Chemistry, Saunders and Frisch, Interscience Publishers, pp. 94–97 (1962).

*Primary Examiner*—John M. Ford
*Attorney, Agent, or Firm*—Joseph C. Gil; Thomas W. Roy

[57] ABSTRACT

The present invention is directed to catalysts obtained by mixing alkali fluorides with quaternary ammonium or phosphonium salts.

The present invention is also directed to a process for the production of these catalysts by stirring alkali fluorides and quaternary ammonium or phosphonium salts in alcohol, separating any deposits formed, removing the alcohol and converting the catalyst into useful form by dilution in solvents or absorption onto support materials.

Finally, the present invention is directed to the use of the new catalysts as trimerization catalysts for the production of polyisocyanates containing isocyanurate groups.

5 Claims, No Drawings

NEW CATALYSTS, THEIR USE FOR THE PRODUCTION OF ISOCYANURATE POLYISOCYANATES

BACKGROUND OF THE INVENTION

1. Field of the Invention

This invention is directed to new catalysts of alkali fluorides and quaternary ammonium or phosphonium salts, to a process for their production and to their use as trimerization catalysts for the production of polyisocyanates containing isocyanurate groups.

2. Description of the Prior Art

Catalysts for the trimerization of organic isocyanates are known (J. H. Saunders and K. C. Frisch, Polyurethanes, Chemistry and Technology, pages 94 et seq. (1962)). Suitable trimerization catalysts are strong organic bases such as the alkali metal salts of carboxylic acids, metal alcoholates, metal phenolates, alkali metal carbonates, tertiary amines, tertiary phosphines and the "onium" compounds of nitrogen and phosphorus and also basic heterocycles of these elements The use of quaternary ammonium hydroxides as catalysts for the trimerization of isocyanurate groups has often been o described. Thus, according to JP-PS No. 601 337 (U.S.Pat. No. 3,487,080), quaternary ammonium hydroxides are used together with certain co-catalysts. While the examples primarily illustrate the partial trimerization of aromatic diisocyanates, some examples illustrate the partial trimerization of aliphatic diisocyanates. However, the catalysts used for the trimerization of HDI in these examples result in predominantly cloudy products which are not suitable for coatings applications.

EP-A-10 589 is a further development of the Japanese patent specification cited above. According to this prior publication, quaternary ammonium hydroxides containing hydroxyalkyl substituents are used as catalysts for the trimerization of HDI. With these catalysts, HDI can be excellently trimerized to form products with no cloudiness. The disadvantage is that the hydroxyalkyl ammonium hydroxides are extremely difficult to produce in colorless form and have to be used in relatively large quantities of up to 0.6%. As a result, the end products of the process, i.e., the isocyanurate polyisocyanates freed from excess starting diisocyanate, may possibly show a yellowish coloration.

EP-A-47,452 describes the production of mixed trimers based on HDI and IPDI. Again, as can be seen from the examples, comparatively large quantities of catalysts are necessary.

Other known catalyst systems for the production of polyisocyanates containing isocyanurate groups also have serious disadvantages. For example, GB-PS No. 920,080, DE-OS No. 3,100,262, DE-OS No. 3,219,608 and DE-OS No. 3,240,613 describe the trimerization of HDI using metal-containing catalysts and co-catalysts such as phenols, alcohols or tertiary amines. The metal compounds can only be removed from the end products by elaborate processes, if at all, and can adversely affect subsequent applications and also the stability of the end products. In addition, the use of cocatalysts containing active hydrogen atoms leads to secondary reactions in which valuable isocyanate groups are consumed. The same also applies to EP-A-155,559, in which ammonium salts of organic acids are used as catalysts together with large amounts of alcoholic compounds.

EP-A-57,653, EP-A-89,297 and EP-A-187,105 describe organosilicon compounds which are used in comparatively large quantities. These compounds also cannot be completely removed from the end product and adversely affect its subsequent use.

Accordingly, an object of the present invention is to provide new catalysts for the partial trimerization of the isocyanurate groups of organic isocyanates which afford the following advantages.

The quantity of catalyst required is minimal.
There is no need to use large quantities of cocatalysts.
The new trimerization catalysts for the production of isocyanurate polyisocyanates result in colorless, noncloudy end products when colorless, noncloudy starting isocyanates are used.

It has now surprisingly been found that this object can be achieved by the catalyst systems described in detail hereinafter.

SUMMARY OF THE INVENTION

The present invention is directed to catalysts obtained by mixing alkali fluorides with quaternary ammonium or phosphonium salts.

The present invention is also directed to a process for the production of these catalysts by stirring alkali fluorides and quaternary ammonium or phosphonium salts in alcohol, separating any deposits formed, removing the alcohol and converting the catalyst into useful form by dilution in solvents or absorption onto support materials.

Finally, the present invention is directed to the use of the new catalysts as trimerization catalysts for the production of polyisocyanates containing isocyanurate groups

DETAILED DESCRIPTION OF THE INVENTION

Starting materials for the catalysts according to the invention include
(a) alkali fluorides corresponding to the general formula MeF, wherein Me represents an alkali metal, preferably potassium
(b) quaternary ammonium or phosphonium salts corresponding to the formula

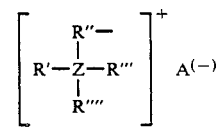

wherein
z represents nitrogen or phosphorus, R' R", R'" and R"" may be the same or different and represent alkyl groups containing 1 to 18 carbon atoms; one of the radicals may be an araliphatic radical containing from 7 to 15 carbon atoms and the sum of the carbon atoms in the four radicals is preferably 10 to 40, and
A(-) is the anion of a strong mineral acid, preferably a chloride or bromide ion.

Suitable examples of suitable starting materials (b) include tetra-n-butyl ammonium chloride or bromide, tricapryl methyl ammonium chloride or bromide, hexadecyl tributyl ammonium chloride or bromide, benzyl trimethyl ammonium chloride or bromide, benzyl triethyl ammonium chloride or bromide, benzyl dodecyl dimethyl ammonium chloride or bromide and the phosphonium salts corresponding to these ammonium salts.

The catalysts according to the invention may be produced by dissolving or suspending the alkali fluoride (a) in alcohols such as methanol or ethanol, and subsequently adding with stirring a quantity of ammonium or phosphonium salt (b). The amounts of components (a) and (b) are not critical but the components are generally present within ±50 mole % of the stoichiometric amount, preferably in an equimolar amount. The temperature and stirring time are also not critical. The components are normally stirred for about 20 to 60 minutes at room temperature; the ratio of component (a) to alcohol is about 0.1 mole to 100–400 g alcohol.

In a preferred embodiment of the present invention the catalysts are "absorbed" onto support materials (heterogeneous catalyst). To this end, the described mixture is thoroughly stirred with the support material in alcohol, insoluble constituents are preferably separated and the alcohol is subsequently removed, for example under vacuum. Suitable support materials include silica gels, aluminum oxides or zeolites; silica gels are preferred. The quantity of support material is selected so that there are about 0.05 to 5 mmol $F^-$, preferably about 0.1 to 2 mmol $F^-$ per g of support material.

The catalyst system according to the invention may of course also be used as a homogeneous catalyst by dilution in solvents after separation of the alcohol. Suitable solvents include ethylhexane-1,3-diol, acetonitrile or dimethylformamide. The quantity of solvent is selected so that there are about 0.005 to 0.5 mmol $F^1$, preferably about 0.01 to 0.1 mmol $F^-$ per g of solution. In some instances it may reveal advantageous to support the catalytic activity of the catalysts of the invention by a small amount of urethane groups. These may be formed in situ by the use of alcoholic solvent for the catalyst which may be used in an amount of from about 0,01 to 1% by weight, based on the weight of the isocyanate starting material for the manufacture of polyisocyanates containing isocyanurate groups. Ethylhexane-1,3-diol is a very suitable alcoholic solvent for this purpose. The alcohols which are preferably used for the manufacture of the catalysts (methanol or ethanol) are less preferred as potential cocatalyst.

As can be seen from the Comparison Examples, the use of the combination according to the invention of alkali fluoride and ammonium or phosphonium salt as trimerization catalyst is critically important to the invention since neither alkali fluoride nor ammonium or phosphonium salt, suitably prepared, is effective on its own.

In the use according to the invention, the quantity of catalyst used depends upon the particular organic diisocyanate and whether the catalyst is in solvent (homogeneous) or on a support material (heterogeneous). Accordingly, the simplest way of determining the particular quantity of catalyst required is a preliminary test. In the case of homogeneous catalysis, the amount of catalyst is generally about 0.01 to 0.1 mmol $F^-$/mole of isocyanate, while in the case of heterogeneous catalysis, the amount is generally about 0.05 to 1 mmol $F^-$/mole of isocyanate. However, when the catalyst is on support materials, it is possible to use even larger quantities because the trimerization reaction can be stopped at any stage by filtration.

The catalysts according to the invention are suitable for the partial trimerization of organic polyisocyanates, i.e., compounds containing two or more isocyanate groups. Suitable starting polyisocyanates for use according to the invention include:

1. aromatic polyisocyanates having a molecular weight above 173, preferably 174 to 400, such as $C_8$–$C_{15}$ alkylbenzene diisocyanates according to EP No. 0 058 368, 2,4- and/or 2,6-toluylene diisocyanate, 2,4-diphenylmethane diisocyanate and/or 4,4'-diphenylmethane diisocyanate, naphthylene-1,5-diisocyanate, 4,4',4"-triisocyanatotriphenylmethane, 2,4,6-triisocyanatotoluene, polyphenyl polymethylene polyisocyanates obtained by phosgenation of aniline/formaldehyde condensates ("crude MDI") or mixtures of these polyisocyanates;

2. aliphatic or cycloaliphatic polyisocyanates having a molecular weight above 139, preferably 140 to 250, such as tetramethylene diisocyanate, hexamethylene diisocyanate (HDI), dodecamethylene diisocyanate, cyclobutane-1,3-diisocyanate, cyclohexane-1,3- and -1,4-diisocyanate, l-isocyanato-3,3,5-trimethyl-5-isocyanatomethyl cyclohexane (IPDI), perhydro-2,4- and/or -2,6-diisocyanatotoluene, perhydro-2,4'- and/or -4,4'-diisocyanatodiphenylmethane or mixtures of these polyisocyanates.

The process according to the invention may be carried out both in the absence of solvents and in the presence of inert solvents and diluents. Suitable inert solvents include apolar diluents such as toluene, xylene, higher aromatics, light gasoline, white spirit and $C_{12}$–$C_{20}$ alkylsulfonic acid esters; inert polar solvents such as esters and ketones; or mixtures of these solvents.

The trimerization reaction according to the invention is generally carried out at a temperature of about 10° to 100° C., preferably about 20° to 80° C. The optimal reaction temperature is governed by the particular starting polyisocyanates used and by the type of trimerization catalysts used and may be determined by a simple preliminary test.

In general, the trimerization reaction according to the invention is terminated when a degree of trimerization (degree of trimerization = percentage of isocyanate groups trimerized, based on the total quantity of isocyanate groups present in the starting polyisocyanate) of about 10 to 70% is reached. The course of the reaction may be followed, for example, by continuous determination of the refractive index.

When the process according to the invention is carried out in the absence of a solvent, optionally with subsequent removal of excess starting polyisocyanate, for example in a thin-layer evaporator, the degree of trimerization is generally about 10 to 40%. When the process according to the invention is carried out in the presence of solvents without subsequent removal of unreacted starting isocyanate, the degree of trimerization is generally about 50 to 70%.

The method by which the trimerization reaction is terminated depends upon the type of catalyst used. In the case of homogeneous catalysis, the trimerization reaction is terminated by the use of suitable catalyst poisons such as organic acids or acid chlorides which deactivate the catalysts according to the invention. Examples include sulfonic acids such as benzene- or toluenesulfonic acid or chlorides thereof, or acidic esters of phosphorous acid or phosphoric acid such as dibutyl phosphite, dibutyl phosphate or di-(2-ethylhexyl)phosphate. The deactivators mentioned by way of example, which react chemically with the catalysts and deactivate them, are generally added to the reaction mixture in a quantity at least equivalent to the catalyst. However, since the catalysts are partially deactivated during the trimerization reaction, it is often sufficient to add a subequivalent quantity of the deactivator. Substances which adsorptively bind the catalysts such as silica gels may also be used to terminate the trimerization reaction. These substances have to be subsequently removed, for example by filtration.

In the case of heterogeneous catalysis, the trimerization reaction is terminated as previously discussed by separation of the heterogeneous catalyst.

The end products of the process according to the invention, particularly when it is carried out in the absence of solvents, may be freed from excess, unreacted starting polyisocyanates in known manner, for example by thin-layer distillation or by extraction to obtain isocyanurate polyisocyanates containing less than 2% by weight, preferably less than 0.5% by weight of monomeric starting polyisocyanates.

Excess starting polyisocyanates are preferably removed when the end products of the process are intended to be used in polyurethane coatings. Before they are used as the polyisocyanate component in two-component polyurethane coatings, the end products of the process according to the invention may be modified, for example by the introduction of urethane, urea, biuret or allophanate groups.

The end products of the process according to the invention may also be used without removal of excess starting polyisocyanates, for example, for the production of polyurethane foams.

The end products of the process according to the invention may be blocked in known manner with suitable blocking agents for isocyanate groups. Examples of blocking agents include phenol, $\epsilon$-caprolactam, malonic acid diethyl ester or acetoacetic acid ethyl ester.

The end products of the process according to the invention and their derivatives obtained by the blocking reaction are valuable starting materials for the production of plastics, preferably polyurethane plastics, by the isocyanate polyaddition process by reaction with compounds containing at least two isocyanate-reactive groups, preferably at least two hydroxyl groups. They are particularly suitable for use as the polyisocyanate component in two-component polyurethane coatings.

The invention is illustrated by the following examples in which percentages are by weight, unless otherwise indicated.

EXAMPLES (A) Production of catalysts on support materials

EXAMPLE I 6.2 g potassium fluoride in 200 g ethanol were stirred at room temperature with a solution of 19.7 g benzyl trimethyl ammonium chloride in 100 g ethanol. After 20 minutes, insoluble constituents were filtered off and the filtrate was stirred with 200 g Kieselgel 60 (Merck, silica gel, 70–230 mesh, ASTM). After stirring for 60 minutes, the ethanol was separated off under vacuum.

A free-flowing catalyst system having the following data was obtained:
$F^-$: 0.42 mmol/g
$Cl^-$: 0.04 mmol/g Additional heterogeneous catalysts produced in accordance with Example I are summarized in Table I.

(B) Production of catalysts in solution

EXAMPLE 9

3.7 g benzyl trimethyl ammonium chloride were added with stirring at room temperature to 1.2 g potassium fluoride in 40 g methanol. After 30 minutes, insoluble constituents were filtered off and 370 g 2-ethylhexane-1,3-diol were added to the filtrate. The methanol was then separated off under vacuum.

A clear catalyst solution having the following data was obtained:
$F^-$: 0.05 mmol/g
$Cl^-$: 0.01 mmol/g

EXAMPLE 10

1.2 g potassium fluoride and 5 g benzyl triethyl ammonium chloride in 40 g ethanol are reacted as in Example 9 and worked up as in Example 9 in 150 g 2-ethylhexane-1,3-diol.

A catalyst solution having the following data was obtained.
$F^-$ 0.11 mmol/g
$Cl^-$ 0.02 mmol/g

EXAMPLE 11

19.3 g methyl trialkyl ($C_8$–$C_{10}$) ammonium chloride[1] (Table I) were added with stirring at room temperature to 2.5 g potassium fluoride in 80 g methanol. After 30 minutes, insoluble constituents were filtered off, the filtrate was freed from methanol in vacuo and the residue was taken up in 370 g acetonitrile. The catalyst solution had the following data:
$F^-$: 0.04 mmol/g
$Cl^-$: 0.01 mmol/g

TABLE I

| | Components (g) | | Solvent | Support (g) | Analytical data | |
|---|---|---|---|---|---|---|
| | | | | | F mmol/g | X mmol/g |
| Example | | | | | | |
| 2 | KF (5)/Adogen 464[1] (38.6) | | $CH_3OH$ | Silica gel[2] (200) | 0.37 | 0.07 x = Cl |
| 3 | KF (3.2)/$(nC_4H_9)_4N^+Br$ (17.3) | | $CH_3OH$ | Silica gel[2] (100) | 0.42 | 0.24 x = Br |
| 4 | KF (3.3)/$(nC_4H_9)_4P^+Br$ (19) | | $CH_3OH$ | Silica gel[2] (100) | 0.47 | 0.3 x = Br |
| 5 | 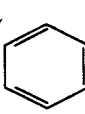 | | $C_2H_5OH$ | Silica gel[2] (100) | 0.70 | 0.03 x = Cl |

TABLE I-continued

| | Components (g) | | Solvent | Support (g) | Analytical data | |
|---|---|---|---|---|---|---|
| | | | | | F mmol/g | X mmol/g |
| 6 | KF (6)/ | CH₂—N⁺(C₂H₅)₃Cl (18.6) | C₂H₅OH | Al₂O₃[3] (200) | 0.45 | 0.03 x = Cl |
| Comp. Example | | | | | | |
| 7 | KF (5.8)/— | | CH₃OH | Al₂O₃ (100) | 0.97 | — |
| 8 | —/ | CH₂—N⁺(CH₃)₃Cl (1.8) | CH₃OH | Silica gel (10) | — | 0.96 x = Cl |

[1] Adogen 464: methyl trialkyl ($C_8$–$C_{10}$) ammonium chloride (Janssen Chimical)
[2] Silica gel: as in Example 1
[3] $Al_2O_3$: Aluminum oxide 90 (Merck, 70–230 mesh, ASTM)

APPLICATION EXAMPLES

(EXAMPLE (a) Partial trimerization of HDI 2016 g (12 moles) HDI were heated under nitrogen to 30° C. 2.9 g of the catalyst of Example 1 were then added and the progress of the reaction was verified through increasing refractive indices. After 29 hours at 30° C., the refractive index $n_D^{23°\,C.}$ had reached 1.4630. The catalyst was filtered off, 6 g silica gel (Example 1) were added to the filtrate to bind any catalyst that had not been completely filtered off and the filtrate was refiltered. Excess HDI was then separated from the filtrate by thin-layer distillation ("short-path evaporator") at 120° C./0.1 mbar to a residual content of 0.1% HDI. 445 g of a clear, colorless polyisocyanate having the following data were obtained:
NCO content: 24%
Viscosity: 2,000 mPa.s/23° C.

COMPARISON EXAMPLES

The Comparison Examples demonstrate the ineffectiveness of comparison catalysts 7 and 8 for the trimerization of organic isocyanates.

COMPARISON EXAMPLE A 336 g (2 moles) HDI were heated under nitrogen to 30° C. 1 g of the catalyst of Example 7 (Table I) was then added. After 3 days, there was no change in the original refractive index $n_D^{23°\,C.}$ of 1.4522. The IR did not show any trimerization bands ($\sim 1690\ cm^{-1}$).

COMPARISON EXAMPLE B

The procedure was as described in Comparison Example A except that 3 g of the catalyst of Example 8 were used instead of the catalyst of Example 7. In this Comparison Example there also was no evidence of trimerization after 3 days.

(EXAMPLE (b)

1680 g (10 moles) HDI were reacted as in Example (a) using 5 g of the catalyst of Example 2. After 15 hours, the refractive index $n_D^{23°\,C.}$ had reached 1.4842. Working up as in Example (a) provided 998 g of a clear colorless polyisocyanate having the following data:
NCO content: 21.2%
Viscosity: 35,000 mPa.s/23° C.

EXAMPLE (c)

1680 g (10 moles) HDI were reacted as in Example (a) using 3 g of the catalyst of Example 3. After 30 h, the refractive index $n_D^{23°\,C.}$ had reached 1.4648. Working up as in Example (a) provided 427 g of a clear polyisocyanate having the following data:
NCO content: 23.9%
Viscosity: 2,100 mPa.s/23° C.

EXAMPLE (d)

A mixture of 672 g (4 moles) HDI and 222 g (1 mole) IPDI (isophorone diisocyanate) was heated under nitrogen to 40° C. and reacted using 3 g of the catalyst of Example (a). After 28 h at 40° C., the refractive index $n_D^{23°\,C.}$ had reached 1.4696. Working up as in Example (a) (thin-layer distillation at 140° C./0.1 mbar) provided 190 g of a clear polyisocyanate having the following data:
NCO content: 22.7%
Viscosity: 3,200 mPa.s/23° C.

GC analysis of the thin-layered distillate revealed a molar ratio of HDI to IPDI of 8:1 for the polyisocyanate.

EXAMPLE (e)

A solution of 360 g 2,4-toluylene diisocyanate, 90 g 2,6-toluylene diisocyanate and 50 g of an alkylbenzene diisocyanate mixture according to EP No. 0 058 368 in 500 g butyl acetate was reacted at 40° C. using 1 g of the catalyst of Example (a). After 24 h at 40° C., the refractive index $n_D^{23°\,C.}$ had reached 1.4939 and the NCO content had fallen to 9.1%. The catalyst was filtered off and an isocyanurate polyisocyanate mixture having the following data was obtained the form of a clear colorless solution:
NCO content: 9.1%
Viscosity: 650 mPa.s/23° C.
Free toluylene diisocyanate: 0.4%
Free alkylbenzene diisocyanate: 0.1%

EXAMPLE (f)

648 g (2 moles) of the alkylbenzene diisocyanate mixture according to EP 0 058 368 were reacted using 3 g of the catalyst of Example 5. After 5 h, the refractive index $n_D^{23°\,C.}$ had reached 1.5290 and the NCO content had fallen from 26% to 19.5%. The catalyst was filtered off and a clear polyisocyanate mixture having the following data was obtained:

NCO content: 19.5%
Viscosity: 1,400 mPa.s/23° C.

EXAMPLE (g) 1680 g (10 moles) HDI were heated under nitrogen to ° C. 12 g of the catalyst solution of Example 9 were then added dropwise over a period of 30 minutes. After 7 h at 40° C., the refractive index $n_D^{23°\ C.}$ had reached 1.4648. The reaction was terminated by the addition of 0.2 g dibutyl phosphate and excess HDI was separated off by thin-layer distillation to a residual content of 0.1% HDI. 450 g of a colorless, clear polyisocyanate having the following data were obtained:

NCO content: 23%
Viscosity: 1500 mPa./23° C.

EXAMPLE (h) 1680 g (10 moles) HDI were reacted at 35° C. as in Example (g) using 7.4 g of the catalyst solution of Example 10. After 6 h at 35° C., the refractive index $n_D^{23°\ C.}$ had reached 1.4611. 10 g silica gel were added and the mixture was stirred for 30 minutes at 35° C. The silica gel was then filtered off and the reaction product was worked up as in Example 9 to provide 330 g of a colorless, clear polyisocyanate having the following data:

NCO content: 23.5%
Viscosity: 1,600 mPa.s/23° C.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. In a process for the preparation of polyisocyanates containing isocyanurate groups by trimerizing a portion of the isocyanate groups of an organic polyisocyanate in the presence of a catalyst, the improvement wherein the catalyst comprises a mixture of
   (i) an alkali fluoride with
   (ii) a quaternary ammonium or phosphonium salt which corresponds to the formula

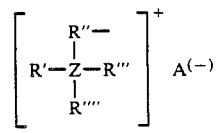

wherein
Z represents nitrogen or phosphorus,
R', R", R''' and R'''' are the same or different and represent alkyl groups containing 1 to 18 carbon atoms, provided that one of the radicals may be an araliphatic radical containing from 7 to 15 carbon atoms and
A$^{(-)}$ represents a chloride or bromide ion.

2. The process of claim 1 wherein the sum of the carbon atoms in R', R", R''' and R'''' is 10 to 40.

3. In a process for the preparation of polyisocyanates containing isocyanurate groups by trimerizing a portion of the isocyanate groups of an organic polyisocyanate in the presence of a catalyst, the improvement wherein the catalyst is prepared by a process which comprises stirring an alkali fluoride and a quaternary ammonium or phosphonium salt in an alcohol, separating any deposits formed, removing the alcohol and converting the catalyst into its useful form by dilution in a solvent or absorption onto a support material.

4. The process of claim 3 wherein said quaternary ammonium or phosphonium salt corresponds to the formula

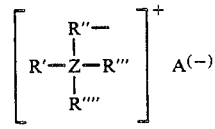

wherein
Z represents nitrogen or phosphorus,
R', R", R''' and R'''' are the same or different and represent alkyl groups containing 1 to 18 carbon atoms, provided that one of the radicals may be an araliphatic radical containing from 7 to 15 carbon atoms and
A$^{(-)}$ represents a chloride or bromide ion.

5. The process of claim 4 wherein the sum of the carbon atoms in R', R", R''' and R'''' is 10 to 40.

* * * * *